United States Patent [19]

Maxon

[11] Patent Number: 5,696,038
[45] Date of Patent: Dec. 9, 1997

[54] BOULE OSCILLATION PATTERNS IN METHODS OF PRODUCING FUSED SILICA GLASS

[75] Inventor: John E. Maxon, Canton, N.Y.

[73] Assignee: Corning Incorporated, Corning, N.Y.

[21] Appl. No.: 712,298

[22] Filed: Sep. 11, 1996

Related U.S. Application Data

[60] Provisional application No. 60/003,596, Sep. 12, 1995.

[51] Int. Cl.$^6$ .................................................. C03B 20/00
[52] U.S. Cl. ........................... 501/54; 501/900; 65/17.4; 65/17.5; 65/414; 65/415
[58] Field of Search ..................... 65/17.3, 17.4, 65/17.5, DIG. 8, 414, 415, 416, 427; 501/54, 900

[56] References Cited

U.S. PATENT DOCUMENTS

| | | |
|---|---|---|
| 3,806,570 | 4/1974 | Flamenbaum et al. . |
| 3,859,073 | 1/1975 | Schultz .......................................... 65/60 |
| 3,930,819 | 1/1976 | Martin . |
| 3,966,446 | 6/1976 | Miller ........................................... 65/414 |
| 4,017,288 | 4/1977 | French et al. ............................... 65/414 |
| 4,065,280 | 12/1977 | Kao et al. . |
| 4,135,901 | 1/1979 | Fujiwara et al. ........................... 65/415 |
| 4,203,744 | 5/1980 | Schultz et al. . |
| 4,231,774 | 11/1980 | Maklad . |
| 4,263,031 | 4/1981 | Schultz . |
| 4,265,649 | 5/1981 | Achener ................................... 65/17.4 X |
| 4,363,647 | 12/1982 | Bachman et al. ......................... 65/17.4 |
| 4,568,370 | 2/1986 | Powers ...................................... 65/415 |
| 4,935,046 | 6/1990 | Uchikawa et al. . |
| 4,978,379 | 12/1990 | Sawada et al. . |
| 5,043,002 | 8/1991 | Dobbins et al. . |
| 5,049,175 | 9/1991 | Ross et al. ................................. 65/427 |
| 5,086,352 | 2/1992 | Yamagata et al. ......................... 359/350 |
| 5,152,819 | 10/1992 | Blackwell et al. . |
| 5,221,309 | 6/1993 | Kyoto et al. . |
| 5,364,430 | 11/1994 | Sarkar ....................................... 65/416 |
| 5,364,433 | 11/1994 | Nishimura et al. ...................... 65/17.4 |
| 5,395,413 | 3/1995 | Sempolinski et al. . |
| 5,401,290 | 3/1995 | Akaike . |
| 5,410,428 | 4/1995 | Yamagata et al. . |
| 5,523,266 | 6/1996 | Nishimura et al. ....................... 501/54 |
| 5,556,442 | 9/1996 | Kanamori et al. . |

FOREIGN PATENT DOCUMENTS

| | | |
|---|---|---|
| 4-12032 | 1/1992 | Japan . |
| 5-97452 | 4/1993 | Japan . |
| 5-116969 | 5/1993 | Japan . |
| 6-166527 | 7/1994 | Japan . |
| 6-234530 | 8/1994 | Japan . |
| 6-234531 | 8/1994 | Japan . |
| 6-308717 | 11/1994 | Japan . |
| WO 93/00307 | 1/1993 | WIPO . |

OTHER PUBLICATIONS

Translation of Japanese Patent Publication No. 4–12032 (Jan. 1992).
"Corning Tests for Striae in Fused Silica," *Laser Focus World*, p. 110, Aug. 1993.
Pfau et al., *Applied Optics*, vol. 31, No. 31, pp. 6658–6661 (Nov. 1, 1992).
Translation of Patent No. 5–97452 (JP Jan.,1993), Item #2 above.
Translation of Patent No. 5–116969 (JP Apr., 1993), Item #3 above.

(List continued on next page.)

*Primary Examiner*—Donald E. Czaja
*Assistant Examiner*—Sean Vincent
*Attorney, Agent, or Firm*—Maurice M. Klee

[57] ABSTRACT

Oscillation/rotation patterns for improving the off-axis homogeneity of fused silica boules are provided. The patterns reduce the optical effects of periodic off-axis striae by decreasing the ratio of $\Delta n_{striae}$ to $\Delta z_{striae}$, where $\Delta n_{striae}$ is the average peak-to-valley magnitude of the striae and $\Delta z_{striae}$ is their average peak-to-peak period. The oscillation/rotation patterns have long repeat periods and cause soot-producing burners to trace out substantially spiral-shaped patterns on the surface of the boule.

37 Claims, 8 Drawing Sheets

```
PV        0.235 WAVES
RMS       0.040 WAVES
Δn        1.4 x 10⁻⁶
THICKNESS 4.210" (10.7cm)
APERTURE  17.3" (43.9cm)
λ         632.8nm
```

OTHER PUBLICATIONS

Translation of Patent No. 6–166527 (JP May, 1994), Item #4 above.

Translation of Patent No. 6–234530 (JP Jul., 1994), Item #5 above.

Translation of Patent No. 6–234531 (JP Aug., 1994), Item #6 above.

Translation of Patent No. 6–308717 (JP Nov., 1994), Item #7 above.

| | |
|---|---|
| PV | 0.235 WAVES |
| RMS | 0.040 WAVES |
| Δn | $1.4 \times 10^{-6}$ |
| THICKNESS | 4.210" (10.7cm) |
| APERTURE | 17.3" (43.9cm) |
| λ | 632.8nm |

FIG. 5

| | |
|---|---|
| PV | 0.029 WAVES |
| RMS | 0.007 WAVES |
| δn | $7.96 \times 10^{-8}$ |
| THICKNESS | 9.17" (23.3cm) |
| APERTURE | 6.51mm |
| λ | 632.8nm |

FIG. 3
PRIOR ART

| | |
|---|---|
| PV | 0.0256 WAVES |
| RMS | 0.0058 WAVES |
| $\delta n$ | $8.98 \times 10^{-8}$ |
| THICKNESS | 7.11" (18.1cm) |
| APERTURE | 6.49mm |
| $\lambda$ | 632.8nm |

FIG. 4
PRIOR ART

| | |
|---|---|
| PV | 0.0282 WAVES |
| RMS | 0.0057 WAVES |
| $\delta n$ | $1.05 \times 10^{-7}$ |
| THICKNESS | 6.685" (17cm) |
| APERTURE | 6.49mm |
| $\lambda$ | 632.8nm |

BOULE OSCILLATION PATTERNS IN METHODS OF PRODUCING FUSED SILICA GLASS

CROSS REFERENCE TO RELATED PROVISIONAL APPLICATION

This application claims the benefit under 35 USC §199(e) of U.S. Provisional application Ser. No. 60/003,596 filed Sep. 12, 1995.

FIELD OF THE INVENTION

This invention relates to the production of fused silica glass and, in particular, to methods for improving the homogeneity of such glass, i.e., for reducing variations in the index of refraction of the glass.

DESCRIPTION OF THE TECHNOLOGY

Figure 1:
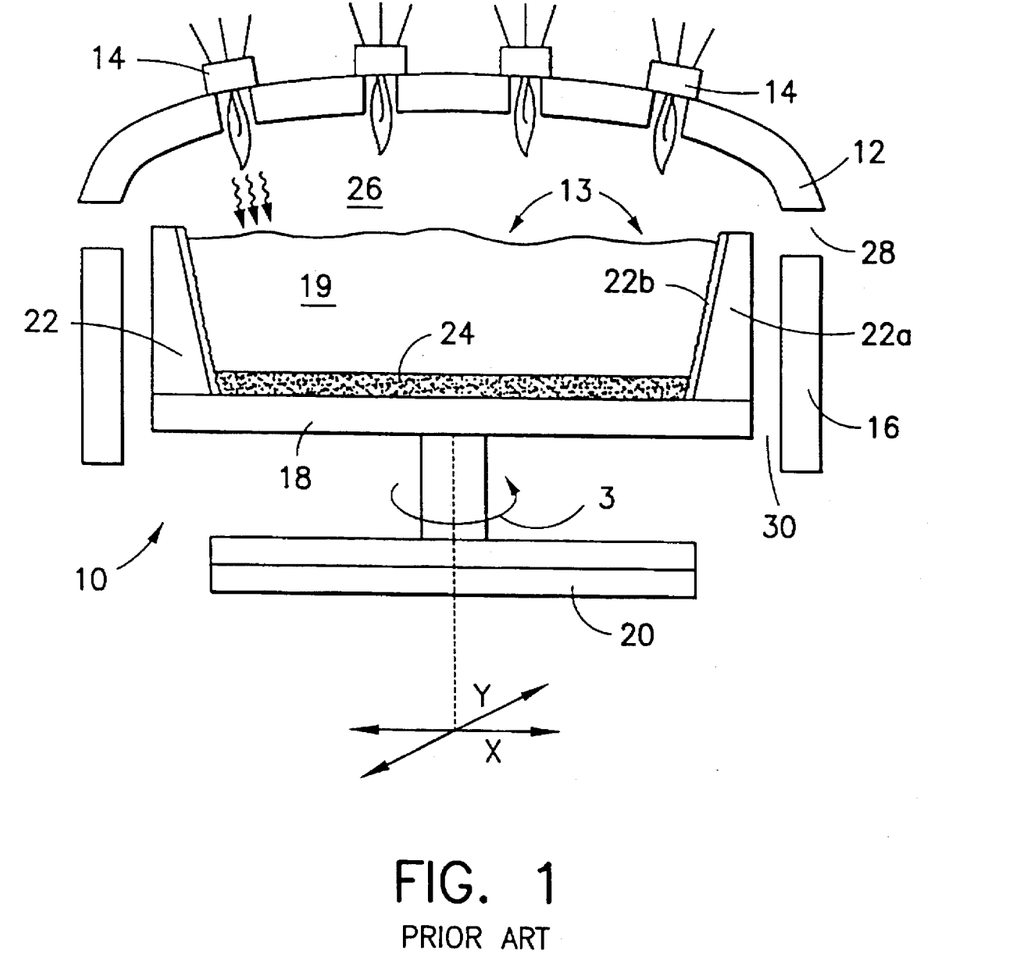
FIG. 1 is a schematic diagram of a prior art furnace used to produce fused silica boules using a flame hydrolysis process.

FIG. 1 shows a prior art furnace 10 for producing fused silica glass. In overview, silicon-containing gas molecules are reacted in a flame to form $SiO_2$ soot particles. These particles are deposited on the hot surface of a rotating body where they consolidate into a very viscous fluid which is later cooled to the glassy (solid) state. In the art, glass making procedures of this type are known as vapor phase hydrolysis/oxidation processes or simply as flame hydrolysis processes. The body formed by the deposited particles is often referred to as a "boule" and this terminology is used herein, it being understood that the term includes any silica-containing body formed by a flame hydrolysis process.

Furnace 10 includes a crown 12 having multiple deposition burners 14, a ring wall 16 which supports the crown, and a rotatable base 18 mounted on a x-y oscillation table 20. The crown, ring wall, and base are each made of refractory materials.

Refractory blocks 22 are mounted on base 18 to form containment vessel 13. The blocks form the vessel's containment wall and the portion of base 18 surrounded by the wall (the bottom of the vessel) is covered with high purity bait sand 24 which collects the initial soot particles. Refractory blocks 22 can be composed of an outer alumina base block 22a and an inner liner 22b made of, for example, zirconia or zircon. Other refractory materials and constructions can, of course, be used if desired. A preferred construction for containment vessel 13, which is suitable for use with the present invention, is described in commonly assigned U.S. patent application Ser. No. 60/003,608, entitled "Containment Vessel for Producing Fused Silica Glass," which was filed on Sep. 12, 1995 in the name of John E. Maxon.

The space 26 between the top of containment vessel 13 and crown 12, which is referred to herein as a "plenum", is vented by a plurality of vents 28 formed at the top of ring wall 16 at its junction with the crown. The vents are connected to a suitable exhaust system by ducting which creates a negative pressure in the plenum. The negative pressure causes air to flow upward through annular gap 30 between the ring wall and the containment vessel. A furnace system which controls for variations in the air flow around the containment vessel and which can be used in the practice of the present invention is described in commonly assigned U.S. patent application Ser. No. 60/003,595, entitled "Furnace For Producing Fused Silica Glass", which was filed on Sep. 12, 1995 in the name of Paul M. Schermerhorn.

As practiced commercially, boules having diameters on the order of five feet (1.5 meters) and thicknesses on the order of 5–8 inches (13–20 cm) can be produced using furnaces of the type shown in FIG. 1. Multiple blanks are cut from such boules and used to make various products, including optical elements, such as, lenses (including lenses for microlithography systems), prisms, and the like. The blanks are generally cut in a direction parallel to the axis of rotation of the boule in furnace 10, and the optical axis of a lens element made from such a blank will also generally be parallel to the boule's axis of rotation. For ease of reference, this direction will be referred to herein as the "z-direction" or the "z-axis." Measurements of inhomogeneity made in a direction perpendicular to the z-axis will be referred to as "off-axis" measurements.

The amount of variation in the index of refraction of a blank which can be tolerated depends on the product which is to be made from the blank. Homogeneity of a blank or optical element is normally measured using interferometric techniques. When large parts are to be made, a large aperture interferometer is used, e.g., an interferometer having an aperture of 18 inches (46 cm).

Figure 2:
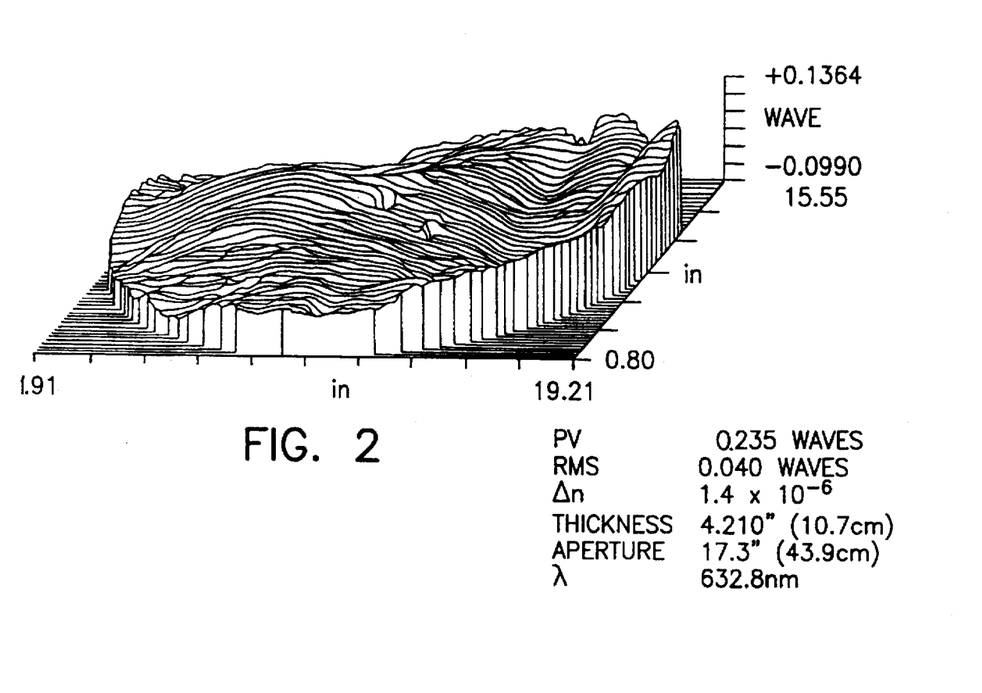
FIG. 2 shows an 17.3-inch (43.9 cm) interferometer phase plot for a section of a fused silica boule prepared in accordance with the present invention. The phase plot is taken along the z-axis of the boule. As shown, the PST, TLT, and PWR components have been removed from the original raw data (ZYGO terminology; Zygo Corporation, Middlefield, Conn.).

FIG. 2 shows an 17.3-inch (43.9 cm) interferometer plot (phase plot) for a fused silica boule prepared in accordance with the present invention. The boule was prepared using (1) a furnace of the type shown in FIG. 1, (2) a containment vessel whose inner walls were sloped at an angle of 10° with respect to vertical, and (3) the oscillation/rotation pattern referred to below as "process 3".

Quantitatively, the z-direction homogeneity of a blank is expressed as its $\Delta n$ value, which is calculated from the interferometer plot using the equation:

$$\Delta n = (\lambda \cdot PV)/t_b, \qquad (1)$$

where $\lambda$ is the wavelength of light used by the interferometer, PV is the difference between the highest peak and the lowest valley of the phase plot, and $t_b$ is the thickness of the blank. The homogeneity of a blank can also be expressed in other ways, such as in terms of the root-mean-square (RMS) deviation of the phase plot, which provides a measure of the variations in n between different points of the blank. See, for example, Japanese Patent Application Disclosure No. 6-308717, published Nov. 4, 1994.

An application for fused silica blanks which requires very low values of $\Delta n$ (e.g., $\Delta n$ values less than or equal to $1.0 \times 10^{-6}$ and preferably less than or equal to $0.5 \times 10^{-6}$ for blanks having a diameter of 125 mm and larger) is in the production of optical elements for microlithography systems.

Microlithography systems are used to produce integrated circuits and generally include a deep UV laser light source, an illumination lens system, and a projection (imaging) lens system. See, for example, Pfau et al., "Quartz inhomogeneity effects in diffraction-limited deep ultraviolet imaging," Applied Optics, Vol. 31, No. 31, pages 6658–6661 (Nov. 1, 1992). The illumination lens system expands the laser beam and homogenizes its intensity. The projection lens system projects a very high resolution image of a mask onto a resist-covered IC wafer.

Diffraction effects limit the line width produced at the IC wafer and thus limit the density of circuits which can be written onto the wafer. In particular, the resolution (R) at the wafer is given by:

$$R = K \cdot \lambda_L / NA, \qquad (2)$$

where K is a constant whose value depends on the particular system and process used, $\lambda_L$ is the operating wavelength of the laser light source, and NA is the numerical aperture of the projection lens system.

Reducing the wavelength of the laser light thus improves the resolution and allows narrower lines to be written on the wafer. Accordingly, in recent years, shorter wavelength lasers, e.g., lasers having a wavelength of 400 nm or less, have come into use in microlithography systems. Examples of such lasers include KrF and ArF excimer lasers which operate at 248 nm and 193 nm, respectively.

At these short (UV) wavelengths, standard optical glasses cannot be used for the optical elements of the system because of their high absorption. Fused silica glass, on the other hand, is transparent in the UV range and has thus become the material of choice for this application.

Because the goal of a microlithography system is to produce an image having a resolution in the submicron range, the lens elements used in such a system, and thus the lens blanks used to produce the lens elements, must be of the highest quality. Among other properties, such lens blanks must have high internal transmission values, e.g., above about 99.8%±0.1% per centimeter, low levels of inclusions, low birefringence, low fluorescence, and high resistance to laser damage at UV wavelengths.

Of critical importance is the blank's $\Delta n$ value since uncontrolled variations in n manifest themselves as uncorrectable aberrations in the image produced at the IC wafer. Moreover, from equation (2) above, to achieve high resolution, large NA values are needed. Large NA values, in turn, mean large lens elements. Accordingly, not only must $\Delta n$ be small, it must be small for large blank sizes.

Examples of the efforts which have been made to achieve this combination of a low $\Delta n$ value and a large blank size include Yamagata et al., U.S. Pat. No. 5,086,352, PCT Publication No. WO 93/00307 published Jan. 7, 1993, Japanese Patent Application Disclosure No. 5-116969 published May 14, 1993, Japanese Patent Application Disclosure No. 6-166527 published Jul. 14, 1994, Japanese Patent Application Disclosure No. 6-234530 published Aug. 23, 1994, and Japanese Patent Application Disclosure No. 6-234531 published Aug. 23, 1994.

In addition to small $\Delta n$ values for large blank sizes, optical elements used in microlithography systems need to have high off-axis homogeneity, again for large blank sizes. See, for example, Japanese Patent Application Disclosure No. 5-97452, published Apr. 20, 1993, which discusses the need for homogeneity in three directions. This is especially important for prismatic elements used in such systems, where optical planes are formed at angles relative to a blank's z-direction. (See the Pfau et al. article cited above; note that off-axis homogeneity is also important for prisms and other optical elements used in applications other than microlithography systems.)

Off-axis homogeneity can be observed and/or measured in various ways, including through the use of a shadowgram in which diverging light from a point source is passed through a sample and the resulting pattern is observed on an observation screen and through diffraction-based techniques where collimated light is passed through a sample and the far-field diffraction pattern is observed in the Fourier transform plane of a long focal length lens (see "Corning Tests for Striae in Fused Silica," *Laser Focus World*, page 110, August 1993).

A preferred method for measuring off-axis inhomogeneity is by means of an interferometer/camera system which has a sufficiently fine spatial resolution to detect the inhomogeneities of interest, e.g., a spatial resolution of 18-20 pixels/ mm of glass. Such resolution can be achieved by employing a high resolution camera or through the use of a beam reducer located between the interferometer and the sample, this latter approach having the disadvantage that only a small portion of a blank or optical element can be examined at a time. To distinguish off-axis inhomogeneities from noise, processing of the interferometer signal can be performed in accordance with the techniques described in commonly assigned U.S. patent application Ser. No. 60/003, 607, entitled "Methods for Detecting Striae", which was filed on Sep. 12, 1995 in the names of David R. Fladd and Stephen J. Rieks.

Figure 3:
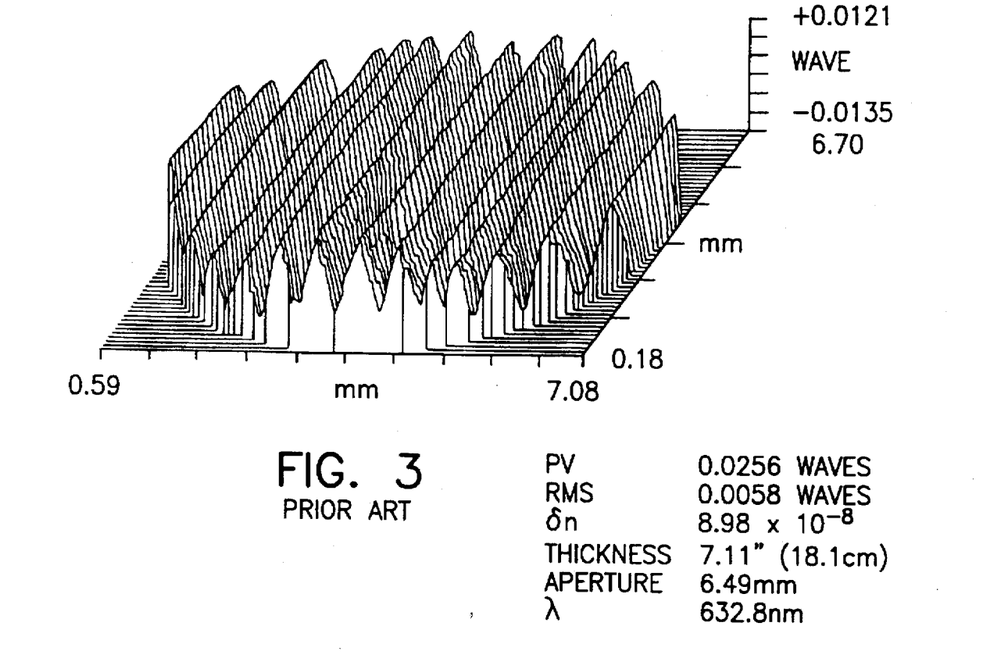
FIGS. 3, 4, and 5 are off-axis phase plots for blanks prepared using prior art furnaces of the type shown in FIG. 1 and containment vessels whose inner walls were sloped at an angle of 10° with respect to vertical. The boule oscillation and rotation parameters used in preparing these blanks are those referred to in Table 1 as process 1 (FIG. 3), process 2 (FIG. 4), and process 3 (FIG. 5). The phase plots of these figures were prepared using a beam reducer between the interferometer and the sample and thus have an aperture of only about 6.5 mm. The data analysis procedures of the above-referenced application entitled "Methods for Detecting Striae" were not used in the preparation of these plots. As shown, the PST and TLT components have been removed from the raw data for each of these figures.

Using procedures of the foregoing type, off-axis inhomogeneities in the form of periodic (sinusoidal) striae have been observed for blanks made using furnaces of the type shown in FIG. 1. FIG. 3 is an off-axis phase plot for a blank prepared using a prior art oscillation/rotation pattern and a furnace of the type shown in FIG. 1. A strong periodic off-axis inhomogeneity having an average peak-to-peak period of about a half a millimeter can be clearly seen in this figure.

Quantitatively, such striae have been found to have $\delta n$ values around $10 \times 10^{-8}$ where $$\delta n = (\lambda \cdot PV)/PL, \quad (3)$$

$\lambda$ is the wavelength of light used by the interferometer, PV is the difference between the highest peak and the lowest valley of the phase plot produced by the interferometer for the striae, and PL is the off-axis path length through the blank.

The present invention is directed to reducing this off-axis inhomogeneity, while at the same time maintaining a high level of homogeneity in the z-direction. In particular, the invention is directed to increasing the average peak-to-peak period (spacing) of the striae ($\Delta z_{striae}$), as well as to reducing their average peak-to-valley magnitude ($\Delta n_{striae}$) at least to some extent. In this way, the ratio of these average values, i.e., the $\Delta n_{striae}/\Delta z_{striae}$ ratio, can be decreased, which reduces the optical effects of the striae.

SUMMARY OF THE INVENTION

In view of the foregoing, it is an object of this invention to provide improved methods for producing silica-containing boules by the flame hydrolysis process. In particular, it is an object of the invention to improve the off-axis homogeneity of such boules and thus the off-axis homogeneity of blanks and optical elements, including prisms and lens elements, made therefrom. It is a further object of the invention to provide blanks and optical elements which have a high off-axis homogeneity, a high z-axis homogeneity, and a large size.

In accordance with the invention, it has been discovered that the off-axis homogeneity of a boule, and thus the off-axis homogeneity of blanks and optical elements made therefrom, depends upon two aspects of the oscillation pattern used to produce the boule.

The first aspect is the repeat period of the oscillation pattern, i.e., the period of time it takes for the boule to return to substantially the same place in the furnace going in substantially the same direction at substantially the same speed. In accordance with the invention, it has been found that $\Delta z_{striae}$, as measured interferometrically, is substantially linearly related to the repeat period. That is, as the repeat period increases, $\Delta z_{striae}$ increases. An increase in $\Delta z_{striae}$, in turn, means a decrease in the $\Delta n_{striae}/\Delta z_{striae}$ ratio, which, as discussed above, means that the optical effects of the striae are reduced.

In particular, it has been found that off-axis periodic striae can be significantly reduced if oscillation patterns having repeat periods greater than about 8 minutes and preferably about 10 minutes are used in the boule preparation process.

It has been further found that there is a substantial difference between the physical amount of glass deposited during a repeat period and the observed $\Delta z_{striae}$. That is, $\Delta z_{striae}$ is on the order of 10–15 times greater than the thickness of glass deposited during the repeat period. In accordance with this aspect of the invention, the repeat period of the oscillation pattern is chosen so as to correspond to the deposition of at least about 0.15 mm of glass and preferably about 0.20 mm of glass.

The second aspect of the oscillation pattern which affects off-axis periodic striae is the pattern's relationship to the overall rotation of the boule relative to the furnace's burners. In accordance with the invention, it has been found that periodic off-axis striae can be substantially reduced if the oscillation pattern and the overall rotation rate are selected so that burners traverse substantially spiral paths over the boule.

In accordance with this aspect of the invention, it has been further found that the use of a pure spiral reduces off-axis striae but at the expense of z-axis homogeneity. Accordingly, in accordance with certain preferred embodiments of the invention, the spiral paths are given at least some wobble to hold $\Delta n$ within acceptable limits (such paths are referred to herein as "substantially spiral paths" or as "spiral-like paths"). In addition, the processing conditions and containment vessel described in the above referenced application entitled "Containment Vessel for Producing Fused Silica Glass" can be used with the spiral or spiral-like patterns to provide the requisite level of z-axis homogeneity. In general terms, the methods and apparatus of that application provide for:

(1) maintaining a sufficiently high boule temperature during the boule formation process so that the boule will flow radially under its own weight with a minimum of head height, specifically, with a head height less than or equal to about 5.0 mm and preferably less than or equal to about 0.125 inches (3.2 mm) of glass;

(2) forming the boule in a containment vessel whose inner radius $r_v$ is substantially larger than the radius $r_b$ of the outermost of the deposition burners used to form the boule, e.g., the ratio of $r_v$ to $r_b$ is at least about 1.1; and/or (3) forming the boule in a containment vessel having an inner containment wall or walls whose vertical height h increases with increasing distance d from the center of the vessel at a rate $\Delta h/\Delta d$ which is less than or equal to about 3.

By means of the invention, blanks and optical elements can be produced having $\Delta n_{striae}/\Delta z_{striae}$ values less than or equal to about $2.0 \times 10^{-8}$ mm$^{-1}$ and preferably less than or equal to about $1.5 \times 10^{-8}$ mm$^{-1}$, and z-axis homogeneity values ($\Delta n$ values) less than or equal to $1.0 \times 10^{-6}$ and preferably less than or equal to $0.5 \times 10^{-6}$ for blank (element) sizes (e.g., diameters for cylindrical blanks) greater than or equal to 125 mm, preferably greater than or equal to 150 mm, and most preferably greater than or equal to 200 mm. To achieve z-axis homogeneity values of $0.5 \times 10^{-6}$ or less, the apparatus and methods of the above referenced application entitled "Containment Vessel for Producing Fused Silica Glass" will generally be needed. Depending upon the capabilities of the testing equipment used, satisfaction of the $\Delta n_{striae}/\Delta z_{striae}$ and the $\Delta n$ criteria can be determined by testing the blank or element as a whole or by testing representative sections thereof. Values for the $\Delta n_{striae}/\Delta z_{striae}$ ratio can be determined manually or automatically by computer using a phase plot or preferably a profile line derived therefrom. See the above-referenced application entitled "Methods for Detecting Striae" and, in particular, the discussion of FIG. 11 of that application.

BRIEF DESCRIPTION OF THE DRAWINGS

It should be noted that the vertical scales in FIG. 2 on the one hand and FIGS. 3, 4, and 5, on the other hand, are different, as are the horizontal scales; in particular, FIGS. 3, 4, and 5 have expanded scales in both the vertical and horizontal direction as compared to FIG. 2.

FIGS. 6A, 7A, and 8A are plots of x(t) versus t for processes 1, 2, and 3, respectively. FIGS. 6B, 7B, and 8B are plots of y(t) versus t, again for processes 1, 2, and 3, respectively.

FIGS. 9A, 10A, and 11A are "spirograms" for processes 1, 2, and 3, respectively, at 300 seconds.

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

The drawing of FIG. 1 is not intended to indicate scale or relative proportions of the elements shown therein.

DESCRIPTION OF THE PREFERRED EMBODIMENTS

As discussed above, the present invention relates to methods for improving the homogeneity of silica-containing bodies made by vapor deposition techniques. The silica-containing body can be substantially pure fused silica or can contain one or more dopants as desired, e.g., the body can contain a titanium dopant which lowers the coefficient of thermal expansion of the glass. Low levels of contaminates may also be present in the body.

Figure 12:
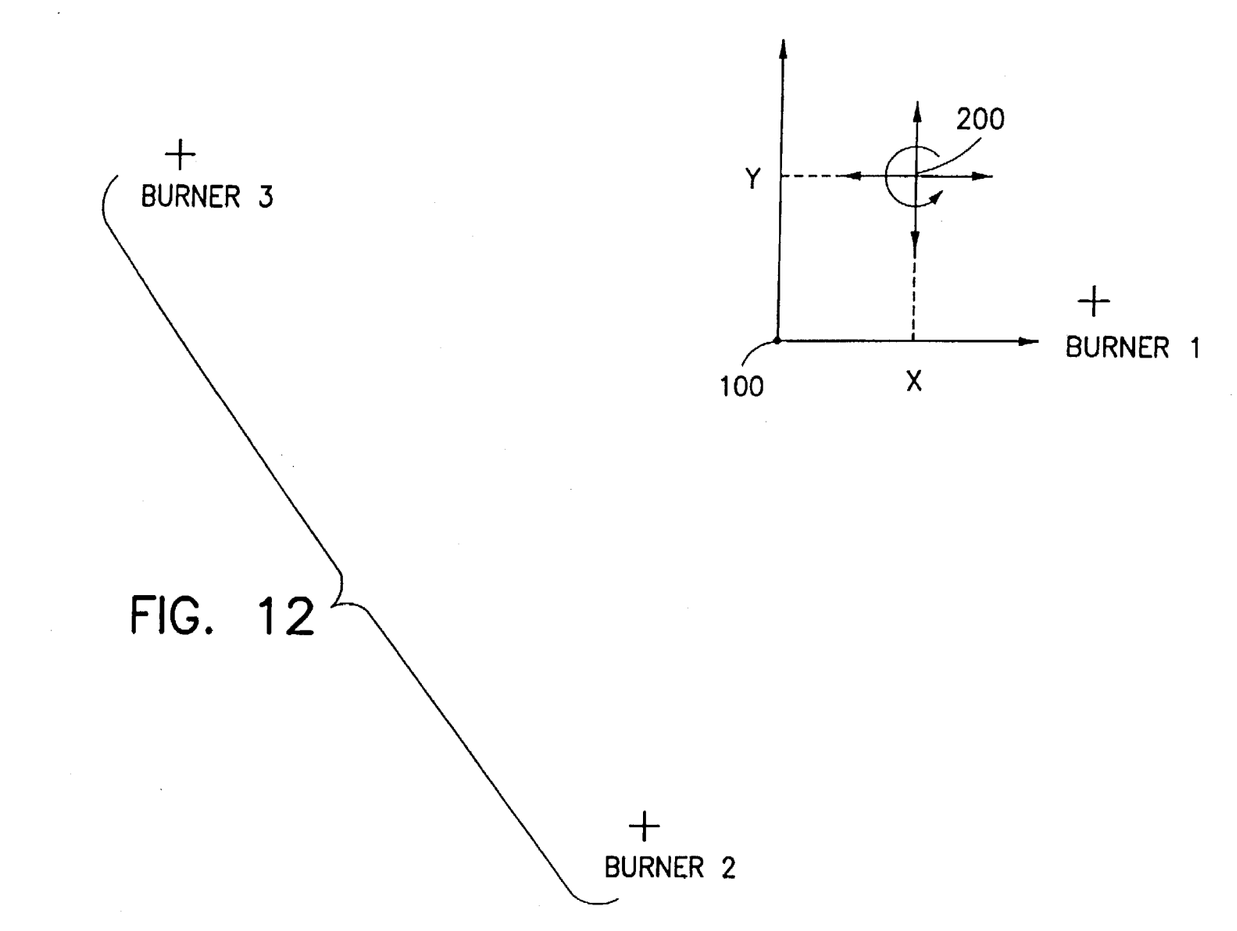
FIG. 12 is a schematic diagram of the burner locations used in producing FIGS. 9–11.

In accordance with the invention, improved off-axis homogeneity is achieved by means of the oscillation/rotation pattern used during the formation of the boule. The particular patterns used in the experiments reported herein were defined by the following equations:

$$x(t) = r_1 \sin 2\pi\omega_1 t + r_2 \sin 2\pi\omega_2 t \quad (4)$$

$$y(t) = r_1 \cos 2\pi\omega_1 t + r_2 \cos 2\pi\omega_2 t \quad (5)$$

where x (t) and y (t) represent the coordinates of the center of the boule as measured from the center of ringwall 16 as a function of time (t) and time is measured in minutes. This geometry is schematically illustrated in FIG. 12, where 100 represents the center of the ringwall and 200 represents the center of the boule. It should be noted that the sum of $r_1$ and $r_2$ must be less than the difference between the radius of the ringwall and the radius of the containment vessel to avoid contact between these structures during formation of the boule.

In addition to the four parameters $r_1$, $r_2$, $\omega_1$, and $\omega_2$, the overall motion of the boule is also defined by a fifth parameter, $\omega_3$, which represents the boule's rotation rate about its center in revolutions per minute (rpm). This overall rotation of the boule is illustrated by reference number 3 in FIG. 1.

It should be noted that oscillation patterns that are more or less complex than those defined by equations (4) and (5) can be used in the practice of the invention, if desired. In particular, more than two frequencies can be used to define x(t) and/or y(t).

Table 1 sets forth three sets of values for $r_1$, $r_2$, $\omega_1$, $\omega_2$, and $\omega_3$ which illustrate the features of the invention. For convenience, these sets of values will be referred to as "process 1", "process 2", and "process 3". Processes 1 and 2 are patterns that were used in the prior art, while process 3 follows the teachings of the present invention. The values in Table 1 are suitable for producing a boule having a diameter of about five feet (1.5 m). Suitable values for producing larger or smaller boules can be readily determined by persons skilled in the art from the disclosure herein.

As discussed above, in accordance with certain aspects of the invention, it has been found that the optical effects of periodic off-axis striae can be reduced by using an oscillation pattern having a sufficiently long repeat period. The repeat period can be determined from x(t) and/or y(t) versus time plots of the type shown in FIGS. 6–8.

Figure 6A:
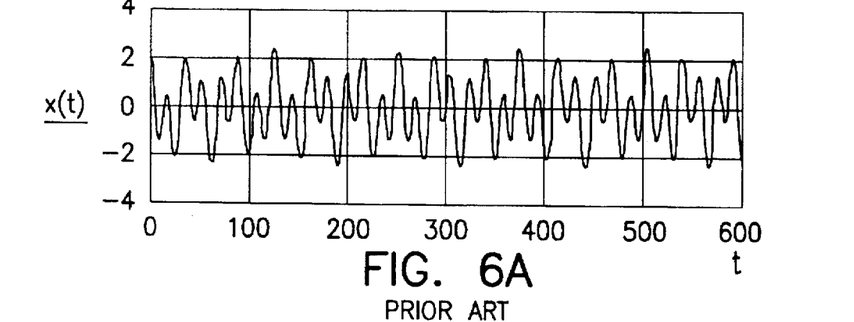
Figure 6B:
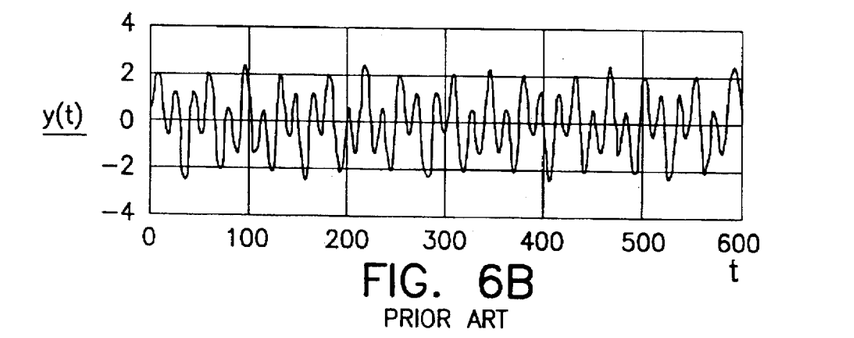
Figure 7A:
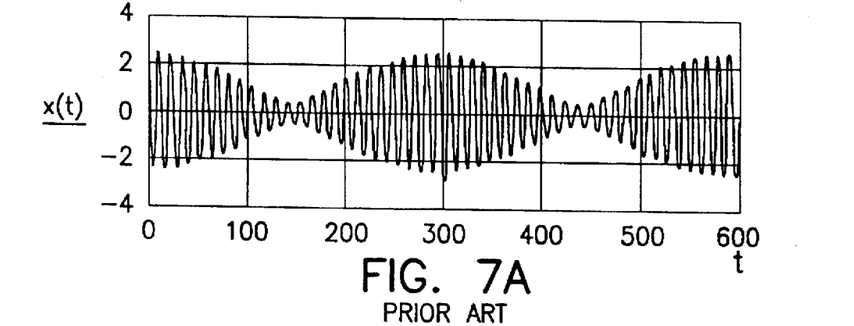
Figure 7B:
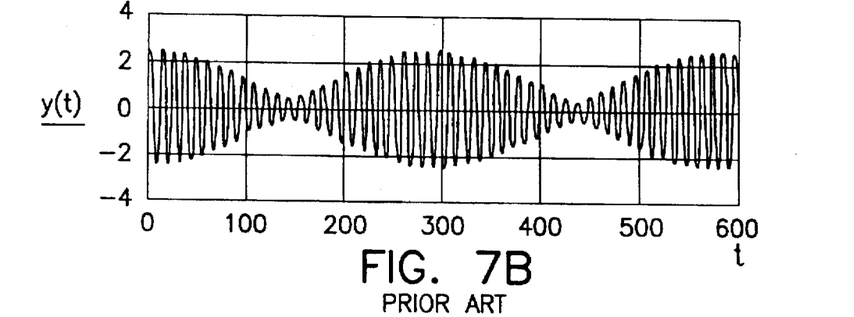
Figure 8A:
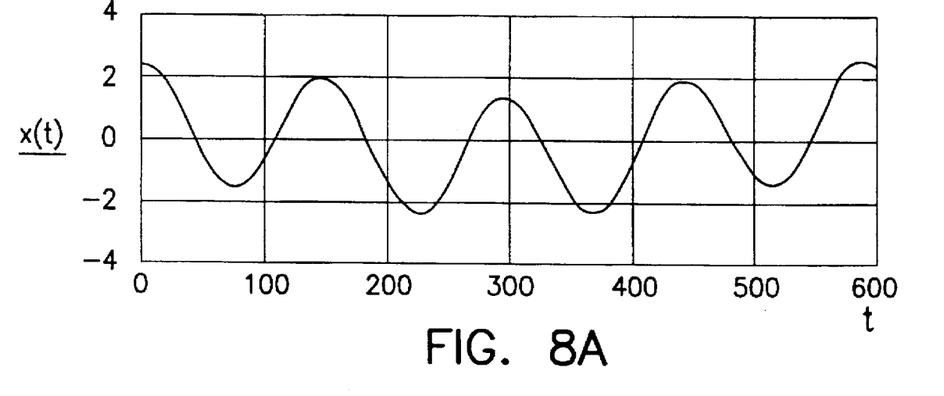
Figure 8B:
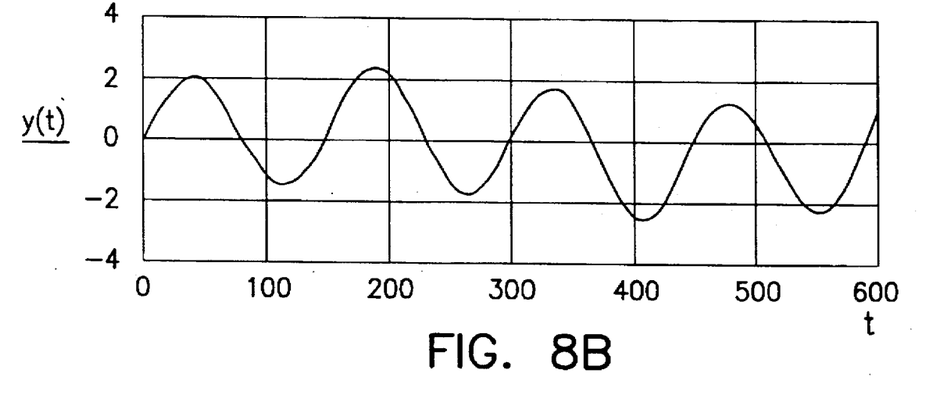

FIG. 6 shows the patterns obtained when $\omega_1 < \omega_2$; FIG. 7 shows the case of $\omega_1 \approx \omega_2$; and FIG. 8 shows the case of $\omega_1 << \omega_2$.

An examination of, for example, FIG. 6A shows that at t=0 and again at about t=120 seconds, x(t) is at its maximum. This maximum corresponds to sin $2\pi\omega_1 t$ and sin $2\pi\omega_2 t$ both being equal to or approximately equal to +1, which occurs when the arguments of these sin functions are each substantially equal to $2n\pi$, n being different for $\omega_1$ and $\omega_2$. In particular, maximums of x(t) occur whenever $\omega_1/\omega_2$ is substantially equal to $n_1/n_2$.

The maximum for t around 120 seconds corresponds to $n_1=3$ and $n_2=7$. This maximum occurs at approximately 2.1 minutes (126 seconds) where $2\pi\omega_2 t=14\pi$ and $2\pi\omega_1 t=6\pi$. The repeat period for process 1 is thus approximately 2.1 minutes.

The tracings of FIG. 7 show a classical beat pattern, having a beat frequency equal to the magnitude of the difference between $\omega_2$ and $\omega_1$. The beat period is simply one over the beat frequency. Accordingly, the repeat period when $\omega_1 \approx \omega_2$ is simply $1/|\omega_2-\omega_1|$. For the process 2 parameters of Table 1, the repeat period is approximately 4.9 minutes (294 seconds).

The tracings of FIG. 8 illustrate the case where $\omega_1 << \omega_2$. For this condition, the repeat period is substantially the same as the period of the slower oscillation, i.e., the repeat period is approximately $1/\omega_1$. For the process 3 parameters of Table 1, the repeat period is thus approximately 10 minutes (600 seconds).

As discussed above, in accordance with the invention it has been found that the optical effects of periodic striae can be reduced by using a repeat period of at least about 8 minutes. It should be noted that such a repeat period can be achieved for any of the $\omega_1$ to $\omega_2$ relationships illustrated in FIGS. 6, 7, and 8, although the relationship of FIG. 8, i.e., $\omega_1 << \omega_2$, is preferred. Similarly, the desired repeat period can be achieved for oscillation patterns whose composition is other than two sinusoidal waves.

In addition to being dependent upon the repeat period of the oscillation pattern, the off-axis periodic striae are also dependent upon the relationship between the oscillation pattern and the overall rotation of the boule about its center. In particular, it has been found that off-axis periodic striae can be significantly reduced if the oscillation pattern and the boule's rotation rate are selected so that the paths which the burners trace across the surface of the boule are spirals.

A set of $\omega$'s and r's which is suitable for use in producing a boule which has a diameter of about five feet (1.5 m) and which produce such a spiral pattern is as follows: $r_1=0$; $r_2=2.5$ inches (6.35 cm); $\omega_1=0$ rpm; $\omega_2=0.45$ rpm; and $\omega_3=6.0$ rpm. Note that $\omega_3$ is greater than $\omega_2$ as is required to produce a spiral path on the boule. Suitable values for producing larger or smaller boules can be readily determined by persons skilled in the art from the present disclosure.

Although a spiral pattern is effective in dealing with off-axis periodic striae, it has the disadvantage that it tends to produce relatively large $\Delta n$ values. In accordance with the preferred embodiments of the invention, this problem is addressed by using burner paths which are substantially spirals, but not pure spirals. The parameters of process 3 produce such spiral-like burner patterns.

Figure 11A:
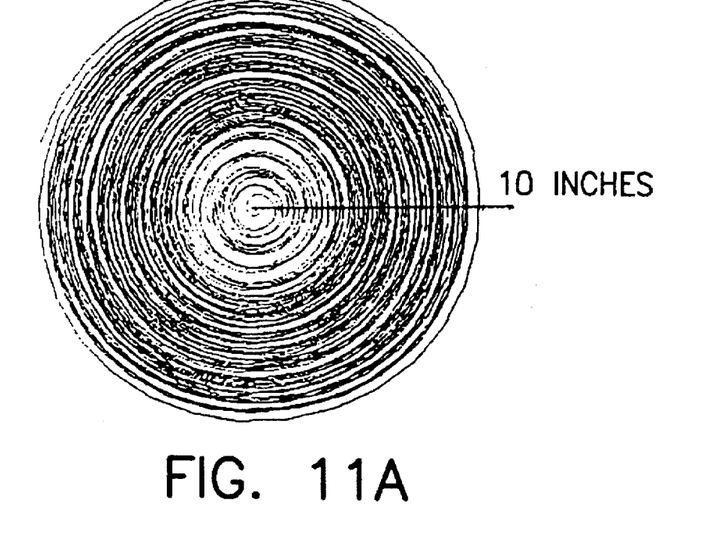
Figure 11B:
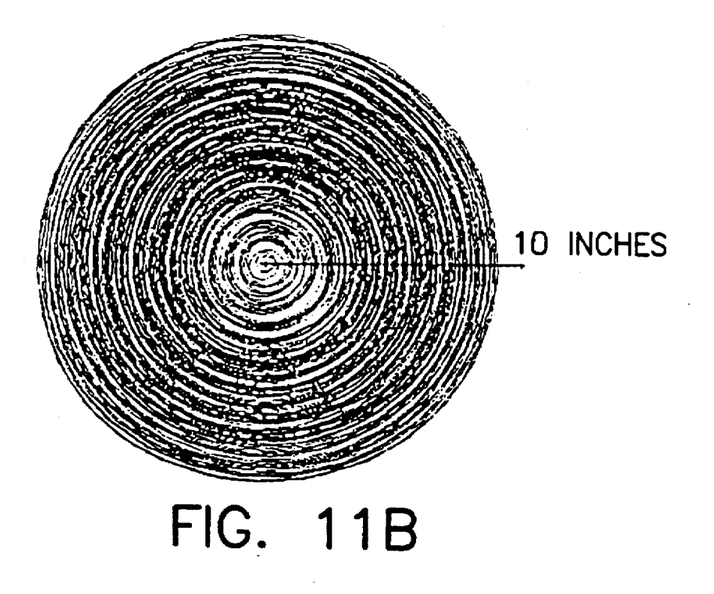

FIG. 11 shows calculated laydown patterns for the process 3 parameters for three burners located near to the center 100 of ringwall 16. The relative locations of these burners are shown in FIG. 12. Their radial distances from center 100 are 2.75 inches (7.0 cm) for burner 1, 5.00 inches (12.7 cm) for burner 2, and 6.63 inches (16.8 cm) for burner 3. FIG. 11A shows the pattern at 300 seconds, while FIG. 11B shows it at 700 seconds. The spiral-like nature of the burner paths is evident in these figures.

Figure 9A:
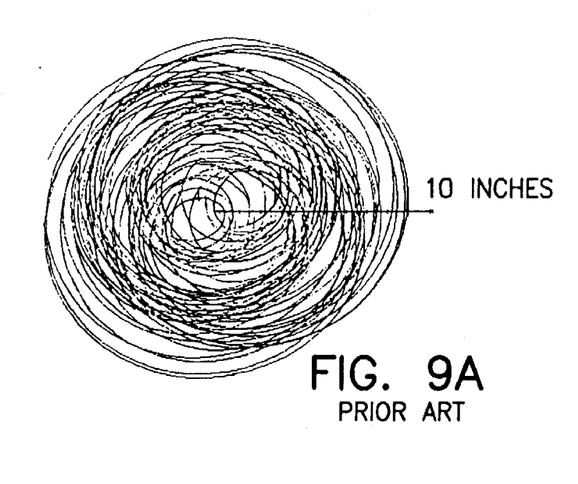
Figure 9B:
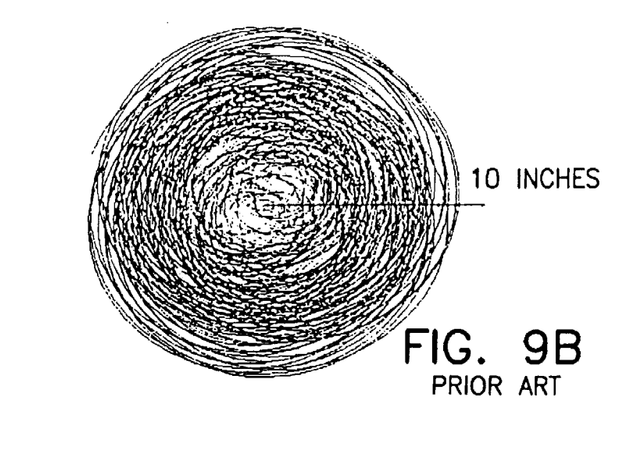
FIGS. 9B, 10B, and 11B are the corresponding spirograms at 700 seconds.
Figure 10A:
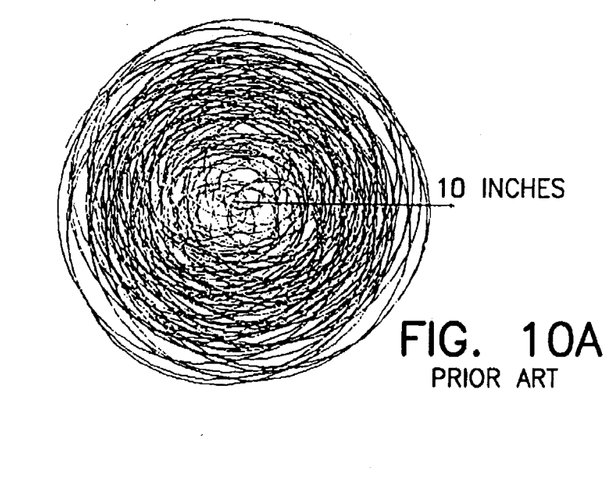
Figure 10B:
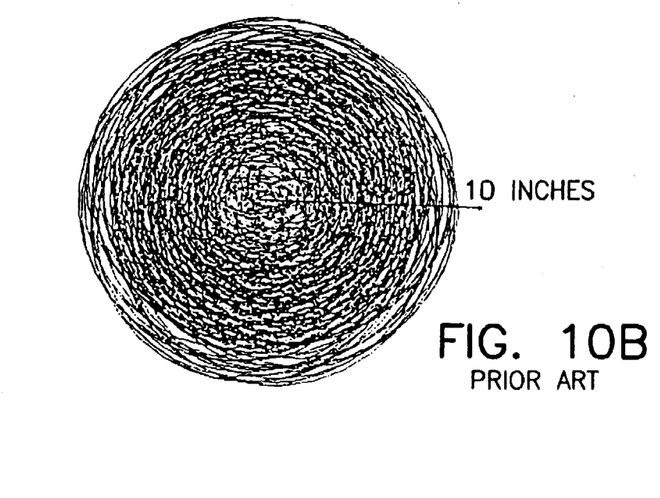

For comparison, FIGS. 9 and 10 show calculated laydown patterns for the same burner locations when processes 1 and 2 are used. As these figures demonstrate, these processes result in patterns which are not spiral-like, but rather are highly reentrant, i.e., the burner's path crosses and recrosses itself as the pattern develops.

Figure 4:
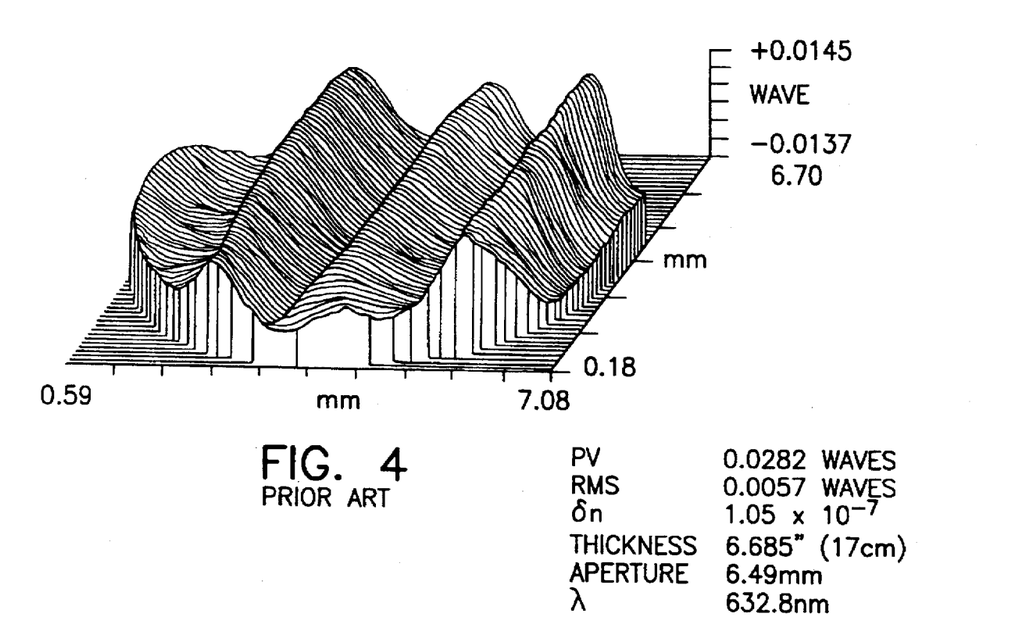
Figure 5:
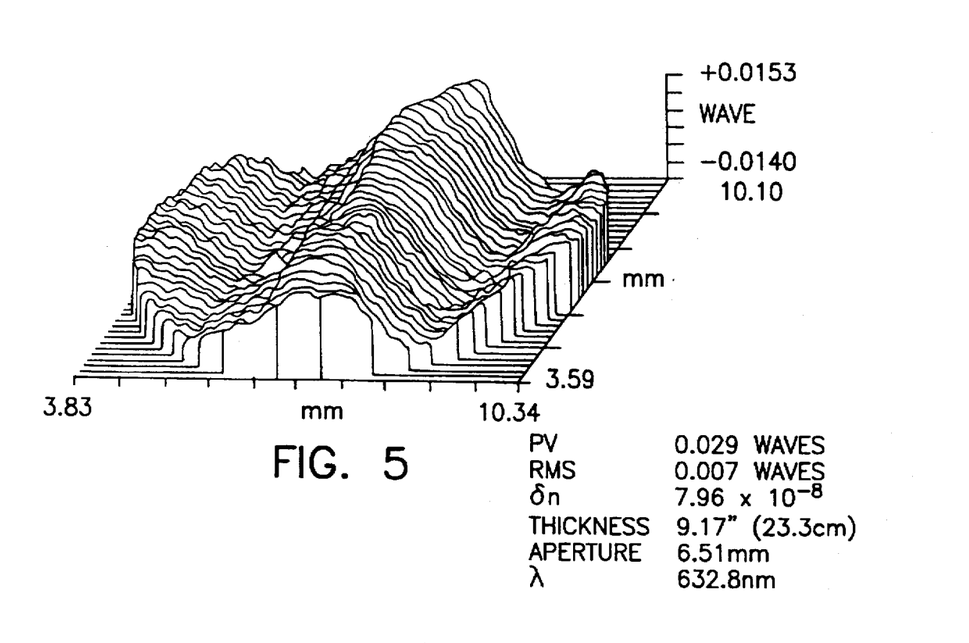

Table 2 and FIGS. 3 (process 1), 4 (process 2), and 5 (process 3) illustrate the significant improvement in off-axis periodic striae achieved by the present invention. As shown therein, process 3 results in a significantly lower $\Delta n_{striae}/\Delta z_{striae}$ value than either process 1 or process 2. The reduction in this value means that the optical effects of the striae are substantially reduced.

For example, in the shadowgram test in which diverging light is passed through a sample and the resulting pattern is observed on a screen, samples prepared using process 1 produced easily visible parallel lines of high contrast on the screen and those prepared using process 2 produced slightly visible parallel lines of low contrast. Process 3, on the other hand, produced samples for which the pattern on the screen was nearly invisible, which is the goal.

As discussed above, it has been found that there is a substantial difference between the observed $\Delta z_{striae}$ and the physical amount of glass deposited during a repeat period. Although not visible in the phase plots of FIGS. 3–5, the underlying structure of the glass which produces the periodic striae of those plots can be seen using the shadowgram technique. Specifically, movement of a sample away from the shadowgram's light source to a position close to the shadowgram's screen has been found to cause a pattern to appear on the screen having a spatial frequency much higher than that observed when the sample is close to the light source. Although not wishing to be bound by any particular theory of operation, it is believed that this finer pattern corresponds to the fine structure of the glass which causes the periodic striae observed in the phase plots.

By means of the invention, significant improvements in homogeneity and off-axis homogeneity have been achieved. For example, using process 3 and the apparatus and methods of the above-referenced application entitled "Containment Vessel for Producing Fused Silica Glass," boules having a diameter of up to 1.53 meters can be manufactured and used to produce blanks having diameters up to 360 millimeters, $\Delta n$ values of less than $0.5 \times 10^{-6}$, and $\Delta n_{striae}/\Delta z_{striae}$ values less than $1.5 \times 10^{-8}$ mm$^{-1}$. Such blanks can be used to produce optical elements for microlithography systems employing, for example, KrF lasers.

Although specific embodiments of the invention have been described and illustrated, it is to be understood that modifications can be made without departing from the invention's spirit and scope. For example, although the invention has been described in terms of stationary burners and a moving boule, it is the relative motion between the source of the soot particles and the boule which is important. Accordingly, in addition to using a stationary source and a moving boule as described above (the preferred approach), the required motion can also be achieved by holding the boule stationary and moving the soot particle source or by moving both the boule and the soot particle source.

A variety of other modifications which do not depart from the scope and spirit of the invention will be evident to persons of ordinary skill in the art from the disclosure herein. The following claims are intended to cover the specific embodiments set forth herein as well as such modifications, variations, and equivalents.

TABLE 1

| | $r_1$ inches (cm) | $r_2$ inches (cm) | $\omega_1$ (rpm) | $\omega_2$ (rpm) | $\omega_3$ (rpm) |
|---|---|---|---|---|---|
| Process 1 | 1.0(2.54) | 1.5(3.81) | 1.4375 | 3.354 | 4.04615 |
| Process 2 | 1.0(2.54) | 1.5(3.81) | 5.3046 | 5.09852 | 6.7018 |
| Process 3 | 0.6(1.52) | 1.9(4.83) | 0.1 | 0.41 | 6.9 |

TABLE 2

| | PV | PL (mm) | $\Delta n_{striae}$ | $\Delta z_{striae}$ (mm) | $\Delta n_{striae}/\Delta z_{striae}$ (mm$^{-1}$) |
|---|---|---|---|---|---|
| Process 1 | 0.015 | 180.6 | $5.2 \times 10^{-8}$ | 0.560 | $9.29 \times 10^{-8}$ |
| Process 2 | 0.017 | 169.8 | $6.3 \times 10^{-8}$ | 1.710 | $3.68 \times 10^{-8}$ |
| Process 3 | 0.015 | 232.9 | $4.1 \times 10^{-8}$ | 2.997 | $1.37 \times 10^{-8}$ |

What is claimed is:

1. A method for forming a silica-containing body comprising:

(a) providing a source of soot particles;

(b) collecting the soot particles to form the body, said collection causing the thickness of the body to increase; and (c) providing relative oscillatory motion between the source and the body as the soot particles are collected, said oscillatory motion being orthogonal to the thickness of the body and having a repeat period;

said collection and oscillation being performed so that the thickness of the body increases by at least about 0.15 mm during the repeat period.

2. The method of claim 1 wherein the thickness of the body increases by at least about 0.2 mm during the repeat period.

3. A method for forming a silica-containing body comprising:

(a) providing a source of soot particles;

(b) collecting the soot particles to form the body, said collection causing the thickness of the body to increase; and (c) providing relative oscillatory motion between the source and the body as the soot particles are collected, said oscillatory motion being orthogonal to the thickness of the body and having a repeat period of at least about eight minutes.

4. The method of claim 3 wherein the repeat period is about 10 minutes.

5. A method for forming a silica-containing body comprising:

(a) providing a source of soot particles;

(b) collecting the soot particles to form the body, said soot particles being consolidated to form a viscous fluid as they are collected, said collection causing the thickness of the body to increase; and (c) rotating the body and providing relative oscillatory motion between the source and the body as the soot particles are collected, said oscillatory motion being orthogonal to the thickness of the body and said rotation and oscillatory motion being such that the projection of the source onto the body traces out a path which is substantially a spiral.

6. The method of claim 5 wherein the path is a pure spiral.

7. The method of claim 5 wherein the source comprises a plurality of soot producing burners and each burner traces out a path which is substantially a spiral.

8. The method of claim 5 wherein the oscillatory motion has a repeat period and the collection and oscillation are performed so that the thickness of the body increases by at least about 0.15 mm during the repeat period.

9. The method of claim 8 wherein the thickness of the body increases by at least about 0.2 mm during the repeat period.

10. The method of claim 5 wherein the oscillatory motion has a repeat period of at least about eight minutes.

11. The method of claim 10 wherein the repeat period is about 10 minutes.

12. A blank made from a silica-containing body made by the method of claim 1, 3, or 5, wherein the blank has:

(a) a $\Delta n_{striae}/\Delta z_{striae}$ value which is less than or equal to about $2.0 \times 10^{-8}$ mm$^{-1}$, where $\Delta n_{striae}$ and $\Delta z_{striae}$ are the average peak-to-valley magnitude and the average peak-to-peak period, respectively, of the blank's off-axis striae; and (b) a z-axis homogeneity $\Delta n$ which is less than or equal to $1.0 \times 10^{-6}$ for a blank size greater than or equal to 125 millimeters.

13. The blank of claim 12 wherein the blank contains a dopant.

14. An optical element made from the blank of claim 12.

15. A method for reducing off-axis periodic striae in the index of refraction of a blank formed from a silica-containing body, said off-axis periodic striae having an average peak-to-valley magnitude $\Delta n_{striae}$ and an average peak-to-peak period $\Delta z_{striae}$, said method comprising:

(a) providing a source of soot particles;

(b) collecting the soot particles to form the body, said collection causing the thickness of the body to increase; and (c) providing relative oscillatory motion between the source and the body as the soot particles are collected, said oscillatory motion being orthogonal to the thickness of the body and having a repeat period which is sufficiently long so that $\Delta n_{striae}/\Delta z_{striae}$ for the blank is less than or equal to about $2.0\times10^{-8}$ mm$^{-1}$.

16. The method of claim 15 wherein the repeat period is sufficiently long so that $\Delta n_{striae}/\Delta z_{striae}$ for the blank is less than or equal to about $1.5\times10^{-8}$ mm$^{-1}$.

17. The method of claim 15 wherein the blank has a z-axis homogeneity $\Delta n$ which is less than or equal to $1.0\times10^{-6}$ for a blank size greater than or equal to 125 millimeters.

18. The method of claim 16 wherein the blank has a z-axis homogeneity $\Delta n$ which is less than or equal to $1.0\times10^{-6}$ for a blank size greater than or equal to 125 millimeters.

19. The method of claim 15 wherein the blank has a z-axis homogeneity $\Delta n$ which is less than or equal to $0.5\times10^{-6}$ for a blank size greater than or equal to 125 millimeters.

20. The method of claim 16 wherein the blank has a z-axis homogeneity $\Delta n$ which is less than or equal to $0.5\times10^{-6}$ for a blank size greater than or equal to 125 millimeters.

21. The method of claim 17, 18, 19, or 20 wherein the blank size is greater than or equal to 150 millimeters.

22. The method of claim 17, 18, 19, or 20 wherein the blank size is greater than or equal to 200 millimeters.

23. The method of claim 15 wherein the body is rotated and the rotation and the oscillatory motion causes the projection of the source onto the body to trace out a path which is substantially a spiral.

24. The method of claim 23 wherein the path is a pure spiral.

25. The method of claim 23 wherein the source comprises a plurality of soot producing burners and each burner traces out a path which is substantially a spiral.

26. A blank made by the method of claim 16, wherein the blank has:

(a) a $\Delta n_{striae}/\Delta z_{striae}$ value which is less than or equal to about $2.0\times10^{-8}$ mm$^{-1}$; and (b) a z-axis homogeneity $\Delta n$ which is less than or equal to $1.0\times10^{-6}$ for a blank size greater than or equal to 125 millimeters.

27. The blank of claim 26 wherein the blank contains a dopant.

28. An optical element made from the blank of claim 26.

29. A fused silica blank which has:

(a) a $\Delta n_{striae}/\Delta z_{striae}$ value which is less than or equal to about $2.0\times10^{-8}$ mm$^{-1}$, where $\Delta n_{striae}$ and $\Delta z_{striae}$ are the average peak-to-valley magnitude and the average peak-to-peak period, respectively, of the blank's off-axis striae; and (b) a z-axis homogeneity $\Delta n$ which is less than or equal to $1.0\times10^{-6}$ for a blank size greater than or equal to 125 millimeters.

30. The fused silica blank of claim 29 wherein the blank's $\Delta n_{striae}/\Delta z_{striae}$ value is less than or equal to about $1.5\times10^{-8}$ mm$^{-1}$.

31. The fused silica blank of claim 29 wherein the blank has a z-axis homogeneity $\Delta n$ which is less than or equal to $0.5\times10^{-6}$ for a blank size greater than or equal to 125 millimeters.

32. The fused silica blank of claim 30 wherein the blank has a z-axis homogeneity $\Delta n$ which is less than or equal to $0.5\times10^{-6}$ for a blank size greater than or equal to 125 millimeters.

33. The fused silica blank of claim 30, 31, 32 or 32 wherein the blank size is greater than or equal to 150 millimeters.

34. The fused silica blank of claim 30, 31, 32 or 32 wherein the blank size is greater than or equal to 200 millimeters.

35. An optical element made from the blank of claim 29.

36. A lens element made from the blank of claim 29.

37. A prism made from the blank of claim 29.

* * * * *